(12) United States Patent
Kang et al.

(10) Patent No.: US 10,589,815 B2
(45) Date of Patent: Mar. 17, 2020

(54) TRANSFORMABLE BICYCLE

(71) Applicant: Byongnam Kang, Busan (KR)

(72) Inventors: Byongnam Kang, Busan (KR);
Jongsuk Kim, Busan (KR); Darea Kang, Busan (KR); Morae Kang, Busan (KR)

(73) Assignee: Byongnam Kang, Busan (KR)

( * ) Notice: Subject to any disclaimer, the term of this patent is extended or adjusted under 35 U.S.C. 154(b) by 0 days.

(21) Appl. No.: 16/344,994

(22) PCT Filed: Oct. 26, 2017

(86) PCT No.: PCT/KR2017/011897
§ 371 (c)(1),
(2) Date: Apr. 25, 2019

(87) PCT Pub. No.: WO2018/080189
PCT Pub. Date: May 3, 2018

(65) Prior Publication Data
US 2019/0270492 A1    Sep. 5, 2019

(30) Foreign Application Priority Data
Oct. 26, 2016  (KR) .................. 10-2016-0141376

(51) Int. Cl.
*B62K 5/02*     (2013.01)
*B62K 13/08*    (2006.01)
(Continued)

(52) U.S. Cl.
CPC .............. *B62K 13/08* (2013.01); *B62B 3/02* (2013.01); *B62B 7/12* (2013.01); *B62J 1/08* (2013.01);
(Continued)

(58) Field of Classification Search
CPC .......... B62K 15/00; B62K 5/02; B62K 19/46; B62K 2015/001; B62B 7/12
See application file for complete search history.

(56) References Cited

U.S. PATENT DOCUMENTS 3,575,436 A *  4/1971  Templeton ............... B62K 7/00
                                              280/7.15
3,658,354 A *  4/1972  Read ..................... B62K 13/04
                                              280/7.15

(Continued)

*Primary Examiner* — John D Walters
*Assistant Examiner* — James J Triggs
(74) *Attorney, Agent, or Firm* — KORUS Patent, LLC; Seong Il Jeong

(57) ABSTRACT

The present invention provides a transformable bicycle. The transformable bicycle including: a pair of front fork members which are connected to a front wheel, and which are arranged with the front wheel interposed therebetween; a head tube which is connected a fork support bar; a frame which is coupled to the head tube, and which is connected such that the head tube is rotatable around a bolt pin; a fastening device which is connected to the head tube; another fastening device which is installed with the fastening device and a spring interposed therebetween; a fastening device handle which allows the front fork members to be folded toward the frame in such a manner that the fastening device handle rotates the head tube connected to the fastening devices around the bolt pin by pulling the fastening devices during rotation around pins; a seat; and a rear wheel.

3 Claims, 21 Drawing Sheets

(51) Int. Cl.
*B62K 19/46* (2006.01)
*B62K 21/16* (2006.01)
*B62B 7/12* (2006.01)
*B62B 3/02* (2006.01)
*B62J 1/08* (2006.01)
*B62K 21/02* (2006.01)
*B62K 15/00* (2006.01)
*B62K 13/00* (2006.01)
*B62K 13/04* (2006.01)

(52) U.S. Cl.
CPC ............... *B62K 5/02* (2013.01); *B62K 13/00* (2013.01); *B62K 13/04* (2013.01); *B62K 15/00* (2013.01); *B62K 15/006* (2013.01); *B62K 19/46* (2013.01); *B62K 21/02* (2013.01); *B62K 21/16* (2013.01); *B62B 2206/006* (2013.01); *B62B 2206/02* (2013.01); *B62B 2301/10* (2013.01); *B62K 2015/001* (2013.01); *B62K 2201/06* (2013.01)

(56) References Cited

U.S. PATENT DOCUMENTS

| | | | | |
|---|---|---|---|---|
| 3,827,705 | A * | 8/1974 | Templeton | B62K 5/02 280/7.15 |
| 8,308,233 | B1 * | 11/2012 | Gradington | B62J 1/14 280/202 |
| 9,365,254 | B1 * | 6/2016 | Durrett | B62K 13/08 |
| 9,457,864 | B2 * | 10/2016 | Bailie | B62K 3/02 |
| 9,840,301 | B2 * | 12/2017 | Barak | B62J 1/08 |
| 9,926,032 | B1 * | 3/2018 | Tong | B62K 19/32 |
| 2018/0050755 | A1 * | 2/2018 | Walter | B62J 9/001 |

\* cited by examiner

TRANSFORMABLE BICYCLE

TECHNICAL FIELD

The present invention relates to a transformable bicycle, and more specifically to a transformable bicycle that can maintain a stable bicycle form so that it can be used as a cart in a market road, a mart, a department store, or the like in the same manner as it travels along a road as a bicycle and that is implemented to also function as an infant baby carriage.

BACKGROUND ART

Generally, various types of articles required in real life are traded at discounted prices in large quantities in department stores or large discount marts, and many people are purchasing various types of household articles in large quantities.

In the case of shopping in such a large discount mart, there is used a customer cart that carries selected articles to a counter or parking lot in a state of temporarily storing them.

In other words, the cart is used as a tool that allows a customer to find and load purchasing target articles while directly pushing the cart itself. In general, separate in-store carts are generally operated, are only movable within the in-store area of a mart or department store, and are only usable up to a parking lot. In other words, shopping carts are chiefly used only to carry articles from in-store areas to cars, and general small-sized carts, which are not for store use, are not frequently used because it is inconvenient to carry empty carts.

Meanwhile, a bicycle is a representative means for easily transporting shopping articles in place of a vehicle. Generally, a bicycle fabricated for this purpose is equipped with a basket on the front thereof or a rear rack on the rear thereof.

However, there is an urgent demand for transportation equipment that can fulfill both the function of a cart and the function of a bicycle because the structure of an article transportation bicycle has a limitation to the implementation of the function of a cart capable of carrying many articles.

PRIOR ART DOCUMENT

Patent Document

Document 1: Korean Utility Model Registration No. 20-0301491

DISCLOSURE

Technical Problem

Accordingly, an object of the present invention is to provide a transformable bicycle that can maintain a stable bicycle form so that it can be used as a cart in a market road, a mart, a department store, or the like in the same manner as it travels along a road as a bicycle and that is implemented to also function as an infant baby carriage.

Technical Solution

In order to accomplish the above object, the present invention provides a transformable bicycle capable of being transformed into a cart through folding, the transformable bicycle including: a pair of front fork members the lower ends of which are connected to a front wheel by fork support bars, the upper ends of which are connected by another fork support bar, and which are arranged with the front wheel interposed therebetween; a head tube which is connected the fork support bar by a head tube shaft; a frame which has a hole into which the head tube is fitted, which is coupled to the head tube by a bolt pin, and which is connected such that the head tube is rotatable around the bolt pin; a fastening device which is located at the upper end of the frame, and which is connected to the head tube; another fastening device which is installed with the fastening device and a spring interposed therebetween; a fastening device handle which is connected to the fastening device by a pin, both sides of which are coupled to the frame by pins, and which allows the front fork members to be folded toward the frame in such a manner that the fastening device handle rotates the head tube connected to the fastening devices around the bolt pin by pulling the fastening devices during rotation around the pins; a seat which is supported on the frame by a seat fastening device; and a rear wheel which is connected to and installed on the back of the frame.

Furthermore, the present invention provides a transformable bicycle capable of being transformed into a cart through folding, the transformable bicycle including: a pair of front fork members the lower ends of which are connected to a front wheel by fork support bars, the upper ends of which are connected by another fork support bar, and which are arranged with the front wheel interposed therebetween; handlebars which are provided at the upper ends of the front fork members; a head tube which is connected to the fork support bar by a head tube shaft; a frame which has a hole into which the head tube is fitted, which is coupled to the head tube by a fastening bolt, and which is connected such that the head tube is rotatable around the fastening bolt; head tube locking slots which are foiled at the upper and lower locations of one side surface of the head tube, respectively; a frame locking slot which is formed in one side of the frame, and which is selectively connected to the head tube locking slots in response to a rotation operation of the head tube; a fastening device handle which is coupled to the frame by a pin, and which is rotated around the pin; a handle stopper which is formed to protrude from the lower end of the fastening device handle, which is fitted into head tube locking slots which are selectively connected to the frame locking slot and the frame locking slot, and which fastens the head tube to the frame; a spring which elastically connects the fastening device handle and the frame to each other; a seat which is supported on the frame by a seat fastening device; and a rear wheel which is connected to and installed on the back of the frame.

The transformable bicycle may further include: a transformable handle which is provided at the center of the fork support bar to be rotatable in left and right directions; leaf springs one-side ends of which are fitted into both side slits of the transformable handle, remaining-side ends of which are fitted into ratchet stoppers coupled to the fork support bar through shafts, and which selectively and elastically support the ratchet stoppers in response to an operation of the transformable handle; fork gears which are coupled to the front fork members through pins, and which are provided with gears which engage with the ratchet stoppers; gears which are disposed in the handlebars, respectively; and handle fastening pins which come into close contact with gear protrusions of the gears.

Advantageous Effects

The transformable bicycle of the present invention enables a user to store articles in a state in which the bicycle has been transformed into a cart when he or she desires to do shopping in a mart or department store while the bicycle is traveling on a road, thereby providing an effect of providing stable traveling and an effect of being used as a substitute for a cart in a market, a mart, a department store, or the like through transformation into a foldable cart.

Furthermore, effects are provided in that easy shopping life culture can be enjoyed after commuting by bicycle, it is possible to commute by the bicycle of the present invention via subway on weekdays because the width and length of the bicycle are narrow, and practicality is increased by adding an infant baby carriage function.

BEST MODE

The present invention provides a transformable bicycle capable of being transformed into a cart through folding, the transformable bicycle including: a pair of front fork members the lower ends of which are connected to a front wheel by fork support bars, the upper ends of which are connected by another fork support bar, and which are arranged with the front wheel interposed therebetween; a head tube which is connected the fork support bar by a head tube shaft; a frame which has a hole into which the head tube is fitted, which is coupled to the head tube by a bolt pin, and which is connected such that the head tube is rotatable around the bolt pin; a fastening device which is located at the upper end of the frame, and which is connected to the head tube; another fastening device which is installed with the fastening device and a spring interposed therebetween; a fastening device handle which is connected to the fastening device by a pin, both sides of which are coupled to the frame by pins, and which allows the front fork members to be folded toward the frame in such a manner that the fastening device handle rotates the head tube connected to the fastening devices around the bolt pin by pulling the fastening devices during rotation around the pins; a seat which is supported on the frame by a seat fastening device; and a rear wheel which is connected to and installed on the back of the frame.

Mode for Invention

Embodiments of the present invention will be described in detail below with reference to the accompanying drawings. In the following detailed description, two representative embodiments of the present invention will be proposed to overcome the above-described technical problem. Furthermore, other embodiments that can be proposed by the present invention will be replaced with descriptions in the configuration of the present invention.

Figure 1:
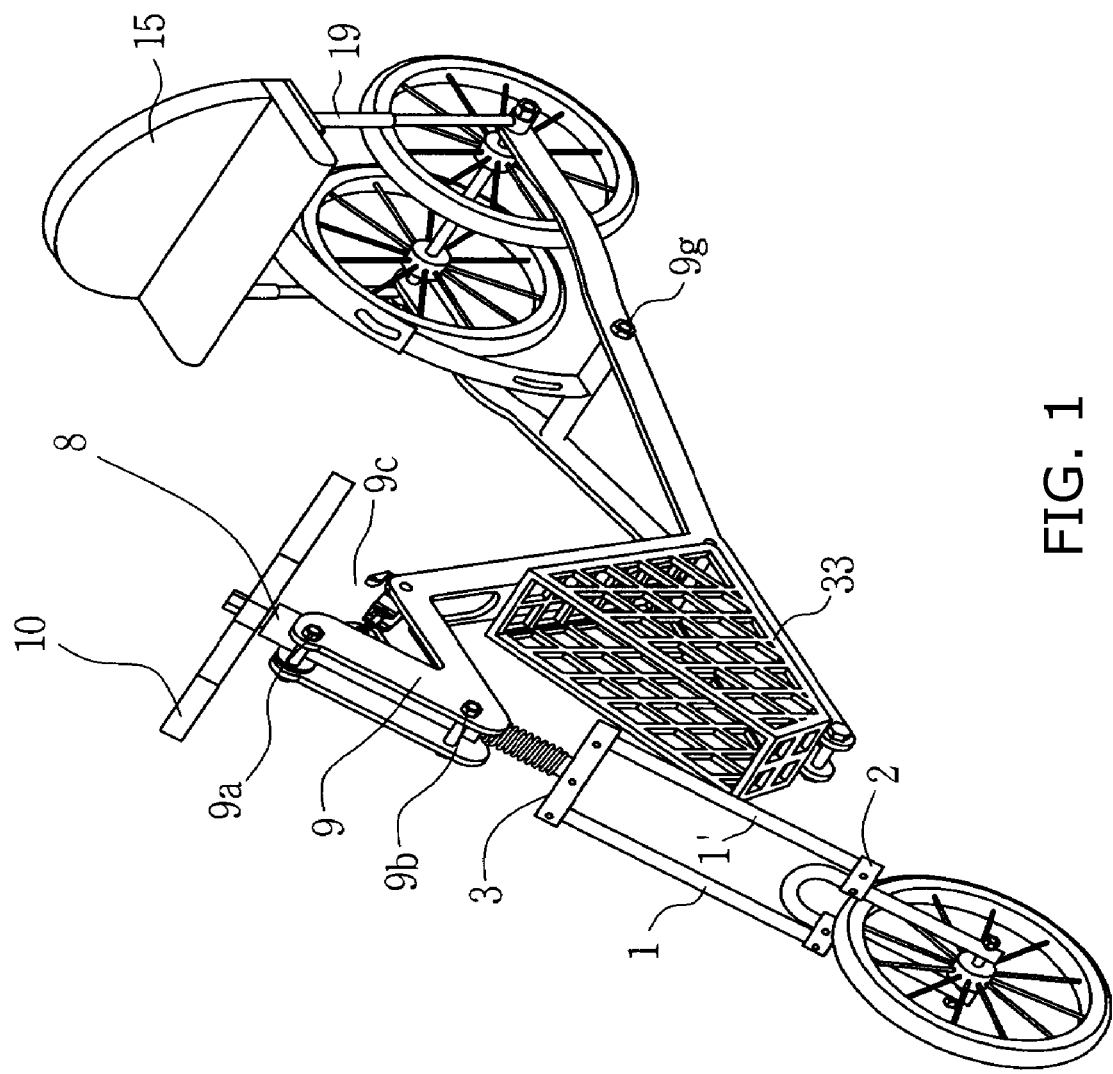
FIG. 1 is a view three-dimensionally showing the structure of a transformable bicycle according to an embodiment of the present invention.

The attached FIG. 1 is a view three-dimensionally showing the configuration of a transformable bicycle according to the present invention.

As shown in FIG. 1, the transformable bicycle has an appearance that is formed by front and rear wheels, front fork members in which two members form a pair of fork members, a head tube, handlebars, a frame, and a seat.

Fork support bars 3, 2, and 2' are fastened to the upper and lower ends of the two front fork members 1 and 1.' In this case, the fork support bars 2 and 2' disposed at the lower ends of the front fork members 1 and 1' are connected to a wheel 20, and the fork support bar 3 disposed at the upper end of the fork 20 is configured to connect a head tube 8 to handlebars 10.

Furthermore, the frame 9 and the head tube 8 are coupled to each other by tightening a bolt pin 29 and a nut 29a in a state in which frame holes 9a formed in the frame 9 and head tube holes 8c formed in the head tube 8 have been aligned with each other so that the front fork members 1 and 1' are connected to the frame 9.

In other words, the above-described transformable bicycle has a general bicycle-type tricycle structure. The above-described transformable bicycle may be configured to be transformed into a newly transformed cart or baby carriage in such a manner that the frame 9 and the front fork members 1 and 1' are folded by being rotated around the bolt pin 29 that be fastened into the frame holes 9a and the head tube holes 8c.

Figure 2:
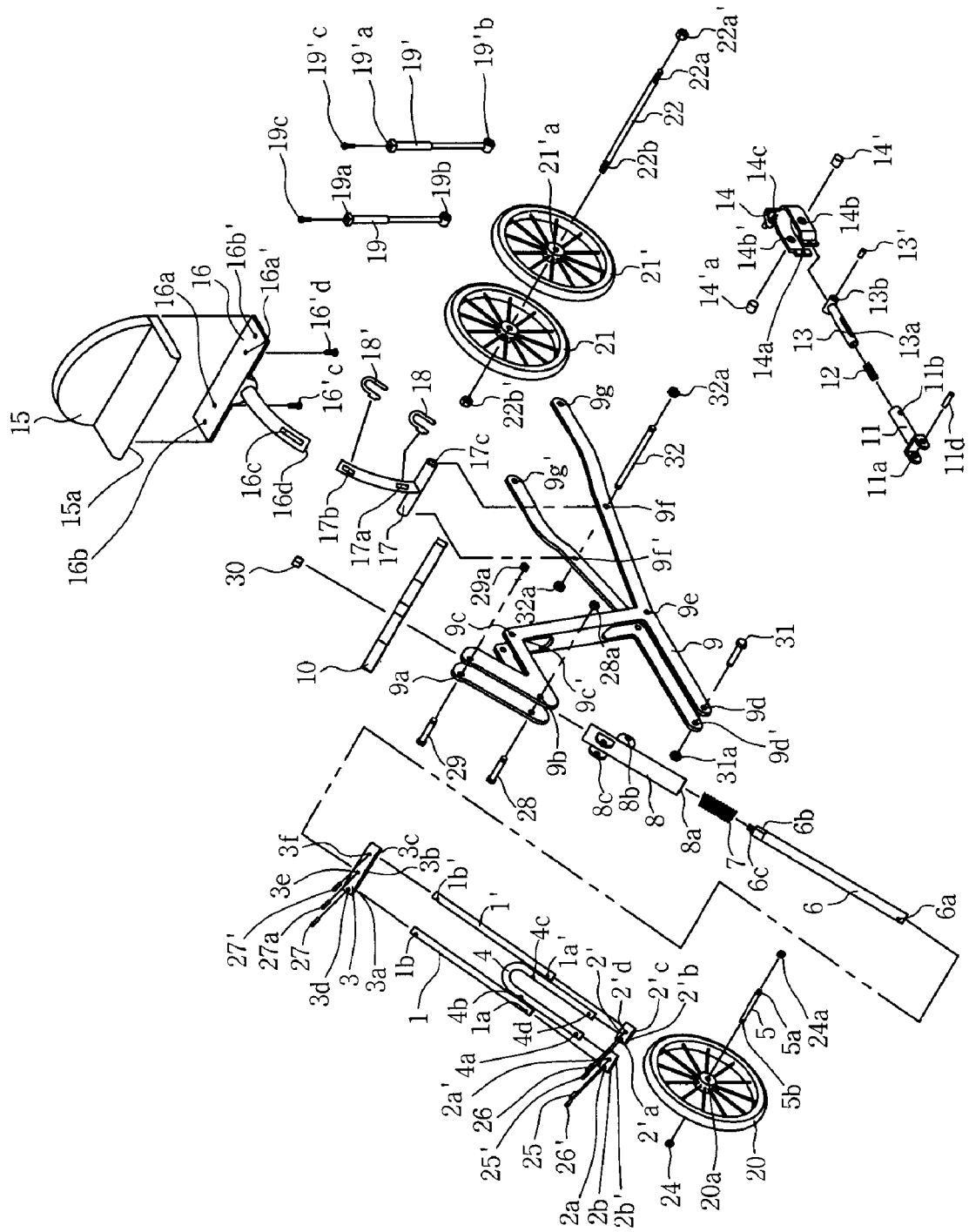
FIG. 2 is an exploded perspective view of FIG. 1.

The attached FIG. 2 is an exploded view showing the important components of the transformable bicycle shown in FIG. 1.

As shown in FIG. 2, a detailed connection structure for the wheel 20 and the front fork members 1 and 1' includes a wheel support fork 4 between the front fork members 1 and 1.' The wheel support fork 4 is fastened by pins 25 and 25' in a state of being inserted into the holes 2a' and 2'a of the fork support bars 2 and 2.' Furthermore, nuts 24 and 24a are tightened in a state in which both ends of a front hub pin 5 have been inserted into the holes 4a and 4d of the wheel support fork 4 in a state in which the front hub pin 5 had been passed through the hub hole 20a of the wheel 20.

In a detailed fastening structure for the front fork members 1 and 1' and the fork support bars 2, 2' and 3, first, the holes 2b and 2'c of the fork support bars 2 and 2' at the lower end are aligned with the lower front fork member holes 1a and 1'a of the front fork members 1 and 1' by inserting the fork support bar holes 2a and 2'd into the front fork member holes 1a and 1'a, and then they are fastened by fitting pins 26' and 26.

Furthermore, the upper front fork member holes 1b and 1b' of the front fork members 1 and 1' are aligned with fork support bar holes 3d and 3f by passing the upper front fork member holes 1b and 1b' through the fork support bar holes 3a and 3c of the fork support bar 3, and then they are fastened by pins 27 and 27.'

A head tube shaft 6 is passed through the fork support bar hole 3b of the fork support bar 3 at the upper end from a lower side, and a head tube shaft hole 6a and a fork support bar hole 3e are fastened by a pin 27a in a state in which they have been aligned with each other. Thereafter, a head tube shaft screw 6c is passed through a spring 7 and a head tube hole 8a and inserted into a handle bar hole 10a, and a nut 30 is tightened over a head tube shaft screw 6c. Accordingly, the wheel 20, the fork support bars 2 and 2,' the front fork members 1 and 1,' the fork support bar 3, the head tube shaft 6, the spring 7, the head tube 8, and the handlebars 10 are all connected and fastened to one another, thereby constructing the front wheel handle part of the bicycle.

The front wheel handle part of the bicycle is connected to a rear wheel frame part in such a manner that the head tube hole 8c of the head tube 8 is aligned with the frame hole 9a of the frame 9, the bolt pin 29 is inserted into the holes 8c and 9a and then the nut 29a is tightened, thereby forming the shape of the transformable bicycle. In this case, the head tube 8 performs a rotation operation around the bolt pin 29.

A separate frame hole 9b is formed in the frame 9 again, and a nut 28a is tightened in a state in which a bolt 28 has been inserted into the frame hole 9b. The bolt 28 limits the movement of the head tube 8 coupled to the frame 9.

A fastening device is installed on the frame 9. The fastening device is a means that is provided to allow the frame 9 to enter between the front fork members 1 and 1' by pulling the head tube 8, to allow the bicycle to be folded, and to allow the bicycle to be transformed into the form of a cart.

In a connection structure for the fastening device 13 and the head tube 8, a spring 12 is inserted into a fastening device hole 13a in the fastening device 13, another fastening device 11 is inserted while compressing the spring 12, and a pin 11' is inserted into a fastening device hole 11b when a fastening device hole 11b is aligned with a square hole 13a, thereby forming the two fastening devices 11 and 13 into one fastening device. The fastening devices 11 and 13 and the fastening device handle 14 are connected to each other by aligning the fastening device hole 13b of the fastening device 13 with the handle hole 14a of the fastening device handle 14 and inserting a pin 13.' The fastening device hole 11a of the fastening device 11 and the head tube (8)-side head tube hole 8b of the front wheel handle part are aligned with each other, and are fastened by a pin 11d.

Furthermore, the right end portion of the fastening device is aligned by inserting fastening device handle holes 14b and 14b' into the frame holes 9c and 9c' of the frame 8 toward the inner surface of the frame 8, and fastening is performed by inserting two pins 14' and 14'a into the fastening device handle holes 14b and 14b,' thereby allowing the function of an operation locking device for the front wheel part and the rear wheel part to be performed.

The seat includes a seat 15 and a seat fastening device 16. In a connection structure for the seat 15 and the seat fastening device 16, the seat post holes 19a and 19'a of seat posts 19 and 19' are aligned with the seat fastening device holes 16b and 16b' of a seat fastening device 16 and these holes are fastened by bolts 19c and 19'c, seat screw holes 15a and 15a are aligned with other seat fastening device holes 16a and 16a' and these holes are fastened by bolts 16'c and 16'd, stopper springs 18 and 18' are inserted into seat connection tube holes 17a and 17b through a seat fastening device hole 16d and stability is achieved, a stopper spring 18' is allowed to operate by aligning a seat fastening device hole 16c and a seat connection tube hole 17b by inserting a seat connection tube 17 into a seat fastening device hole 16d, a seat connection tube hole 17c is aligned with frame holes 9f and 9f,' a seat connection tube fastening pin 32 is passed through these holes, and fastening is performed by nuts 32a and 32a,' thereby connecting the seat 15 and the frame 9 to the seat fastening device 16.

In connection with the rear wheel part, the rear wheel hub holes 21a and 21'a of the rear wheels 21 and 21' are aligned with the frame holes 9g and 9g' of the frame 9 by bringing the rear wheel hub holes 21a and 21'a into contact with an outer wall, seat post holes 19b and 19'b are all aligned, a rear hub pin 22 is passed therethrough, and rear hub pin screws 22a and 22b are fastened by nuts 22a' and 22b,' thereby constructing the form of the bicycle.

An operation of transforming the transformable bicycle of the present invention, which is configured as described above, into a cart will be described with reference to FIGS. 3 to 8.

First, the head tube 8 uses the pin 29, coupled to the frame 9, as a rotating shaft. In this case, the head tube 8 is caught on another pin 28 of the frame 9 and stops without rotating in the arrow direction. In this state, the head tube 8 performs an operation of being rotated around the pin and being folded by the pulling operations of the fastening devices 11 and 13.

Figure 3:
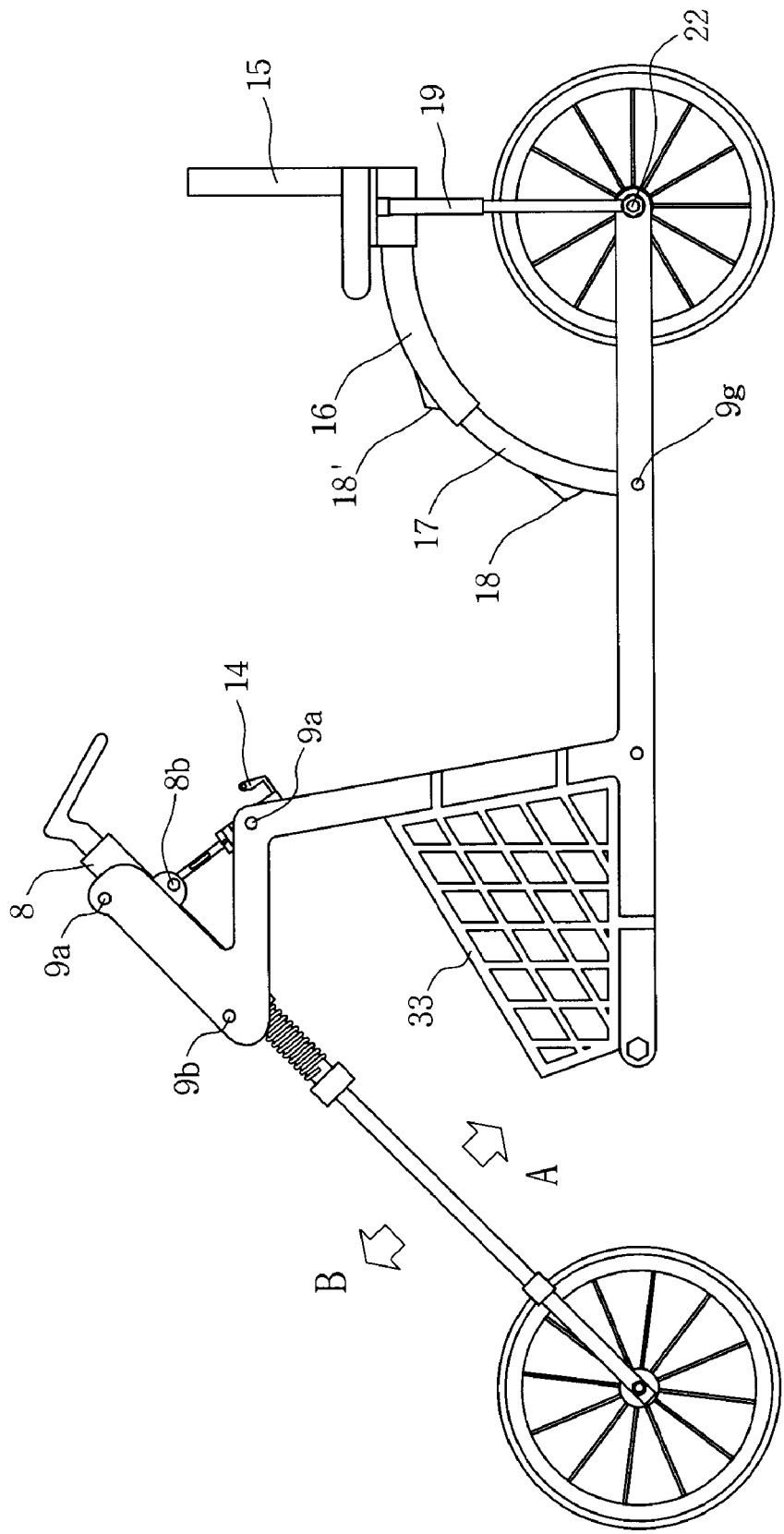
FIGS. 3 to 6 are views sequentially showing a process in which the transformable bicycle of FIG. 1 is transformed into a cart.
Figure 4:
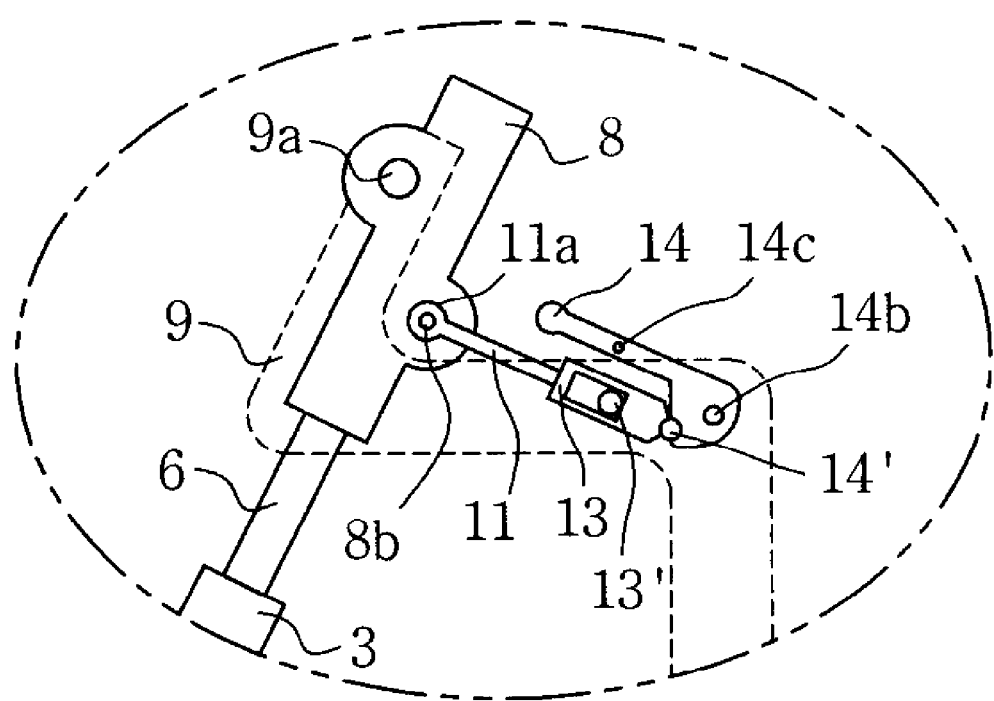

In other words, as shown in FIGS. 3 and 4, the spring 12 elastically pushes the head tube 8 in the direction of arrow B inside the fastening device 13, the fastening device handle 14 is pushed in the direction of arrow A by the elasticity, and thus the fastening device handle 14 that is rotated in a state of being fastened to the frame hole 9c by pin 14' and 14'a is rotated in a counterclockwise direction around the pins 14' and 14'a. In this case, a fastening device handle stopper 14c is caught on the frame 9, and is stopped.

Figure 5:
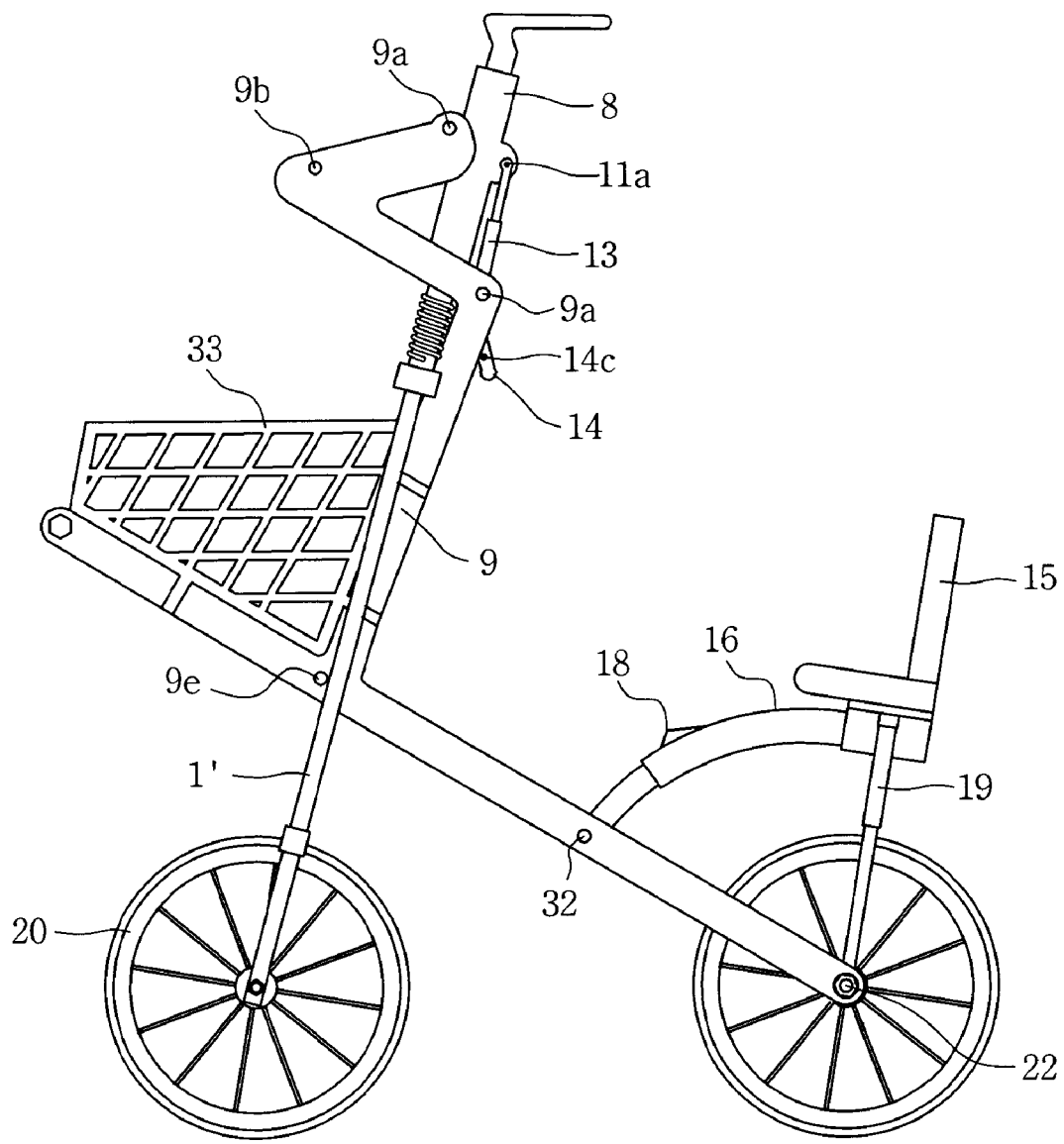
Figure 6:
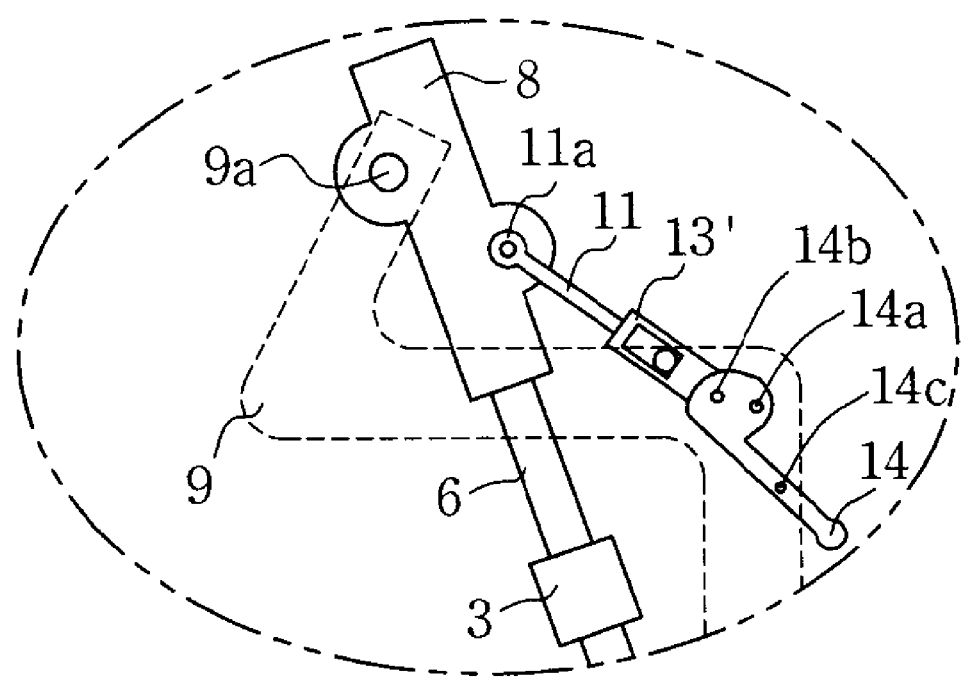
Figure 7:
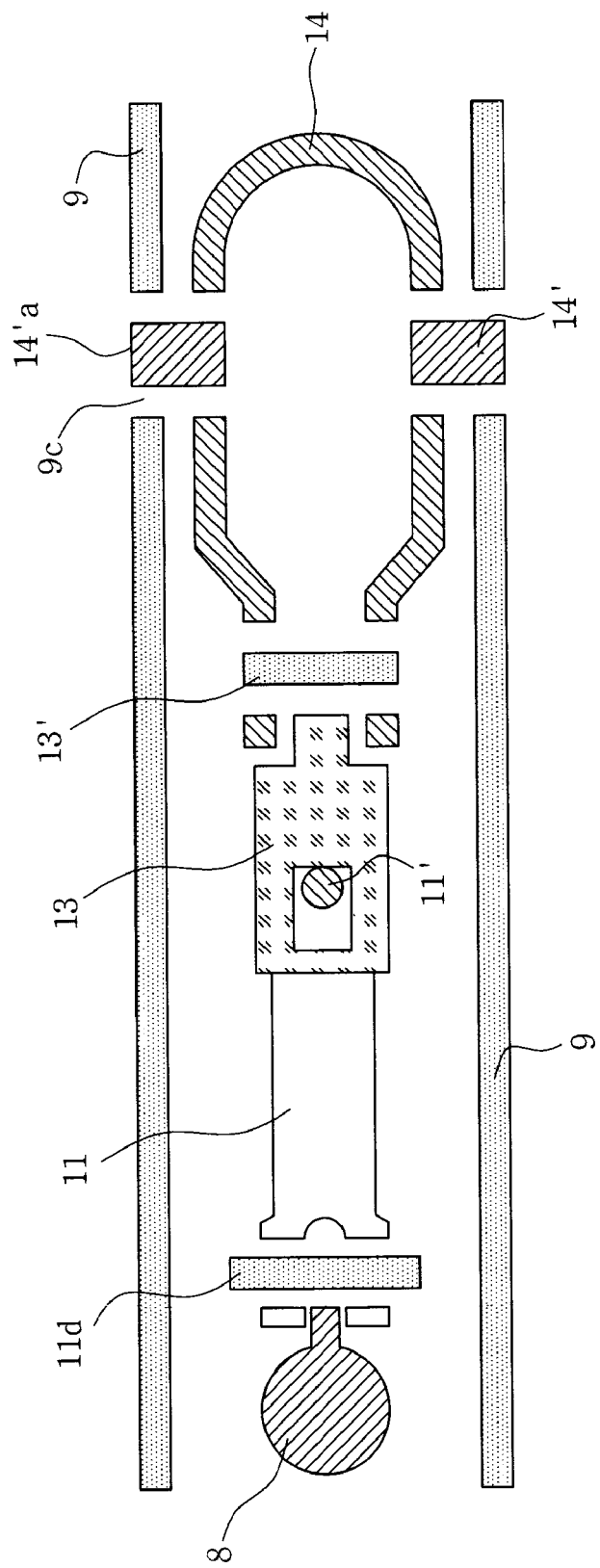
FIG. 7 is a plan sectional view of the fastening device of FIG. 1.
Figure 8:
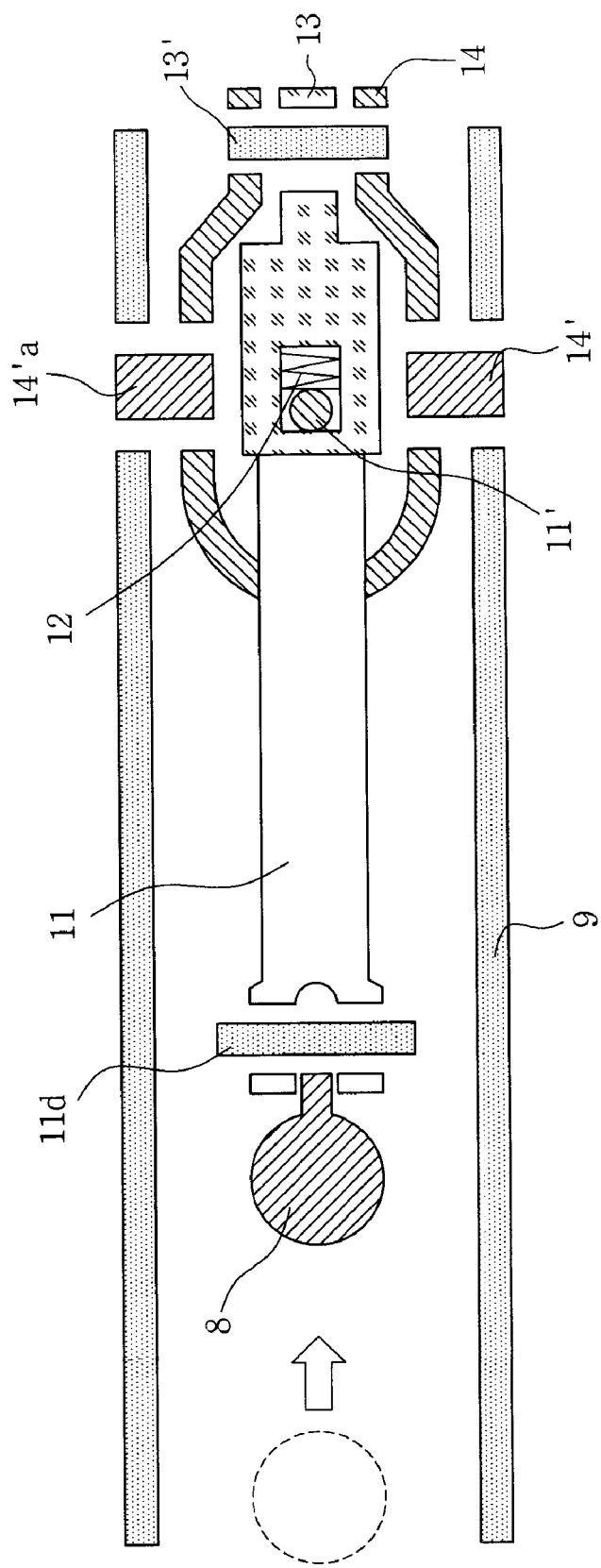
FIG. 8 is a view showing the operating state of the fastening device of FIG. 7.

Meanwhile, when the fastening device handle 14 is pulled in the above state (see FIGS. 7 and 8), the head tube 8 is pulled through the fastening devices 11 and 13. In this process, as shown in FIGS. 5 and 6, the head tube 80 is rotated around the pin 29, is moved in the direction of arrow A, is fastened to the fastening device handle stopper 14c and fixed without further moving in the direction of arrow B. The front fork members 1 and 1' are folded through the rotation of the head tube 8. Accordingly, the general bicycle form of FIG. 3 is transformed into the cart (baby carriage) form of FIG. 5. In this case, a basket 33 mounted on the bicycle has a predetermined width. Accordingly, the structure of the front fork members 1 and 1' having a width larger than the width of the basket 33 allows the basket 33 to pass therethrough, thereby implementing transformation into a cart (baby carriage)-type structure.

Next, as shown in FIG. 5, when the seat is pushed to the frame 9 in a state of pressing the stopper spring 18,' the seat and the seat fastening device hole 16 are moved, and then the stopper spring 18 is raised and the moved seat 15 is fastened. Furthermore, in the case where the seat is restored to the original state, the seat 15 is pushed in a direction opposite to the initial direction in a state of pressing the stopper spring 18, the stopper spring 18' is raised in the seat fastening device hole 16.

Figure 9:
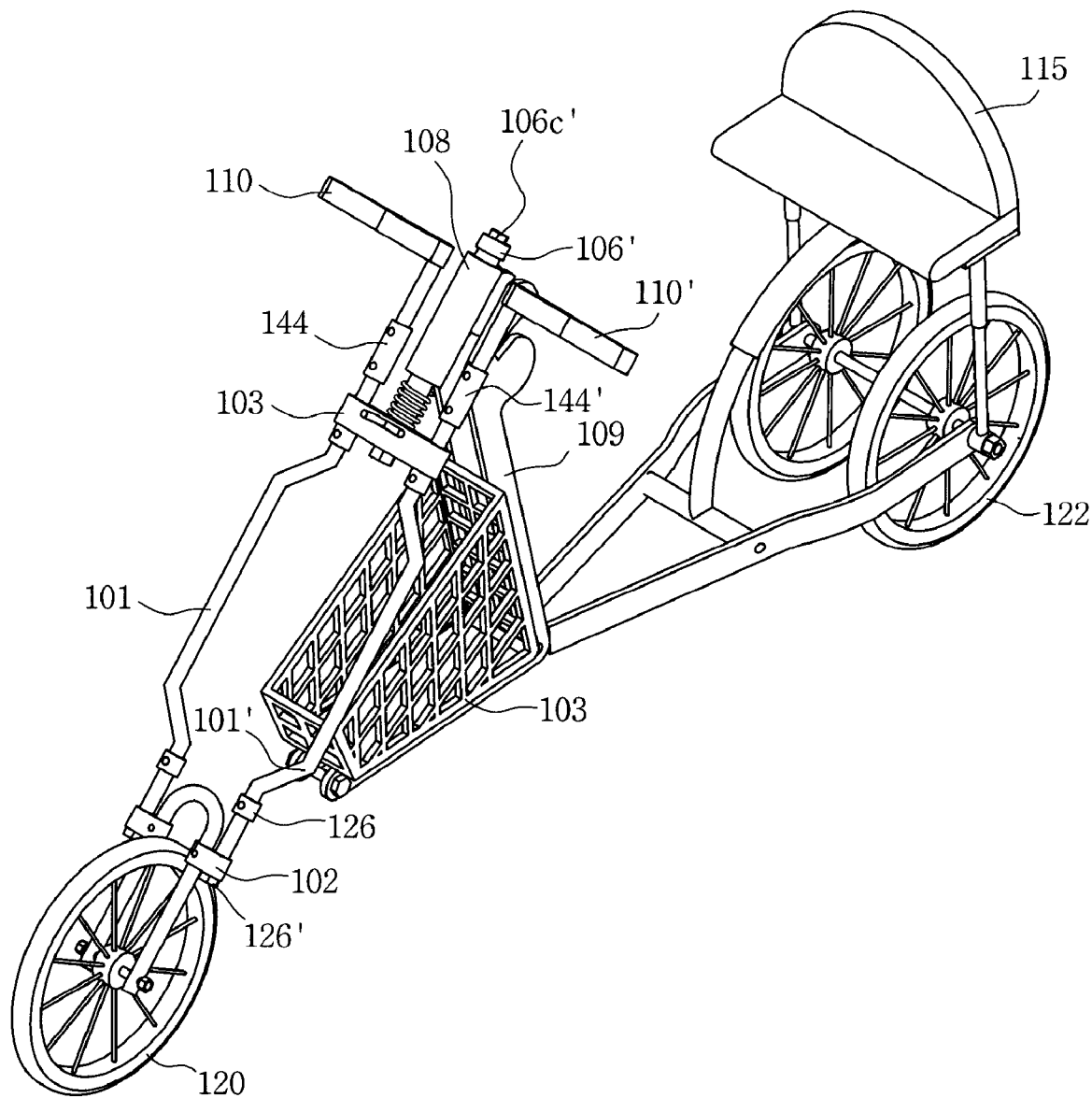
FIG. 9 is a view three-dimensionally showing the configuration of a transformable bicycle according to another embodiment of the present invention.
Figure 10:
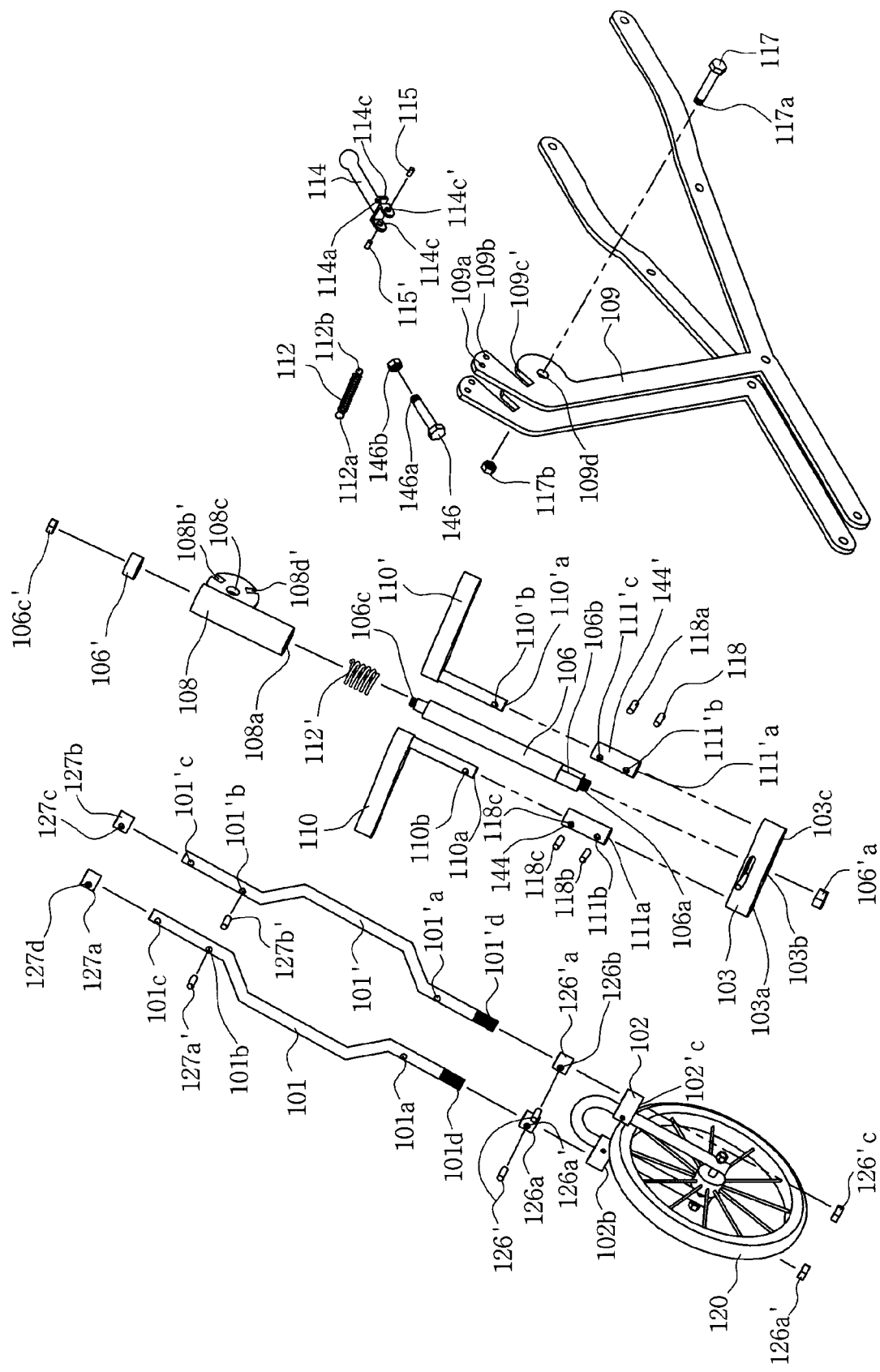
FIG. 10 is an exploded perspective view of FIG. 9.

Meanwhile, the attached FIG. 9 is a view showing another embodiment of the transformable bicycle of the present invention, and FIG. 10 is an exploded view of the configuration of FIG. 9.

As shown in FIGS. 9 and 10, the transformable bicycle according to another embodiment of the present invention is the same as the previous embodiment in terms of the lower end basket 133 of a frame 109, the seat 115 of a seat part, etc., except that the structure of front fork members 101 and 101' installed on fork support bars 102 and 102' is bent in the front direction of the bicycle, handlebars 110 and 110' are formed by extending the front fork members 101 and 101,' and the shape of the upper end portion of the frame 109 and a method of assembling a head tube 108 are opposite.

Fork rings 126a and 126'a are inserted into screw portions 101d and 101'd formed in the lower ends of the front fork members 101 and 101' in a state in which the lower ends of the front fork members 101 and 101' have been passed through the holes 102b and 102c of the fork support bars 102 and 102,' fastening is performed by pins 118b and 118 in a state in which the fork ring holes 126'a and 126b of the fork rings 126a and 126'a and the front fork member holes 101b and 101'b of the front fork members 101 and 101' are aligned with each other, and nuts 126a' and 126'c are tightened over the screw portions 101d and 101'd again in the state, thereby performing assembly.

Front fork member holes 101c and 101'c formed in the upper ends of the front fork members 101 and 101' are inserted into and passed through the fork support bar holes 103a and 103c of the fork support bar 103, are inserted into the holes 111a and 111'a of the handlebar connection tubes 144 and 144,' and are fastened by pins 118c and 118a in a state in which the front fork member holes 101c and 101'c of the front fork members 101 and 101' have been aligned with the handlebar connection tube holes 111b and 111'b of the handlebar connection tubes 144 and 144.'

Furthermore, a square portion 106b formed at the lower end of a head tube shaft 106 is fitted into the fork support bar square portion 103b of the fork support bar 103, a nut 106'a is tightened over a square screw portion 106a formed on the square portion 106b of the head tube shaft 106, and an upper screw portion 106c formed at the upper end of the head tube shaft 106 is fastened by a nut 106c' in a state of passing through the above-described spring 112,' the head tube hole 108a of the head tube 108, and a head tube ring 106' provided at the upper end of the head tube 108.

In connection with the front wheel handle part having the assembly structure, the frame hole 109d of a frame 109 is fastened by a fastening bolt 117 and a nut 117b in a state of being aligned with the head tube hole 108c of a head tube 108, the handle part performs forward and backward predetermined rotational movement around the fastening bolt 117, and the present invention simultaneously performs two functions, i.e., a bicycle function and a cart function, through the rotational movement.

Meanwhile, a fastening device configured to selectively block and allow the rotation of the head tube 106 is installed at the upper end of the frame 109.

The fastening device includes a fastening device handle 114. The fastening device handle holes 114c and 114c' of the fastening device handle 114 are fastened by pins 115 and 115' in a state of being aligned with the frame holes 109b and 109b' of the frame 109, and a nut 146b is tightened over the screw portion 146a of a fastening bolt 116 in a state in which the fastening bolt 116 has been inserted into other frame holes 109a and 109a' of the frame 109.

A configuration is made such that one end 112a of a spring 112 is held by the fastening bolt 116 fastened into the frame hole 109a and the other opposite end 112b of the spring 112 is held by another fastening device handle hole 114a of the fastening device, and thus the spring 112 is configured to have tensile force.

Meanwhile, the fork support bar 103 is further provided with a means for spreading front fork members 101 and 101' in an outer direction when the bicycle is folded.

Figure 11:
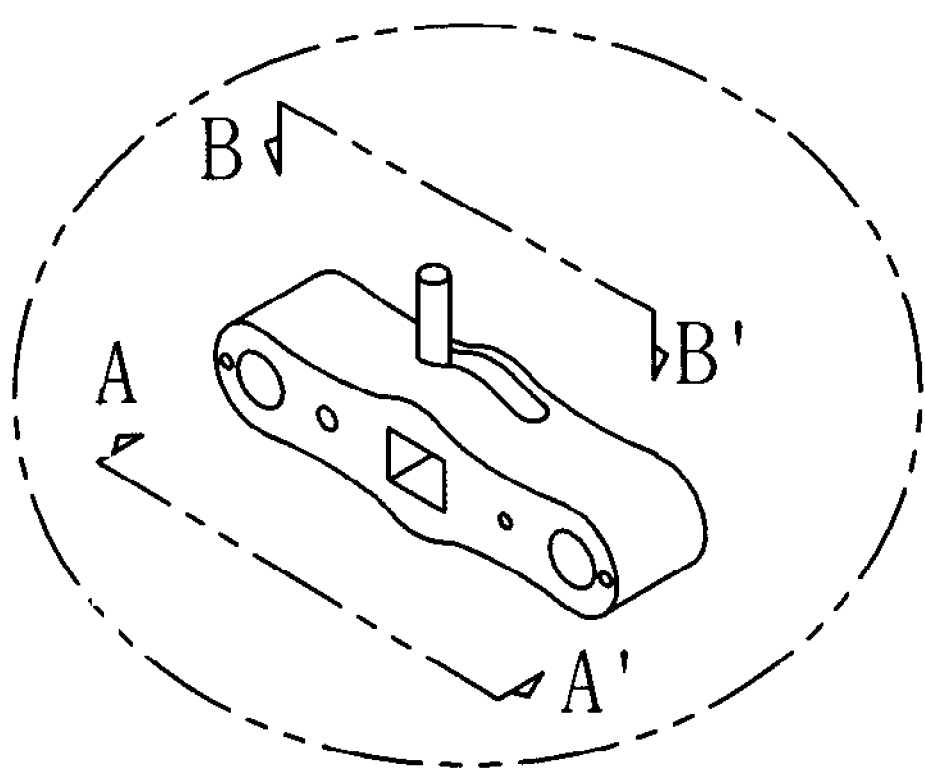
FIG. 11 is an excerpt view of the fork support bar of FIG. 9.
Figure 12:
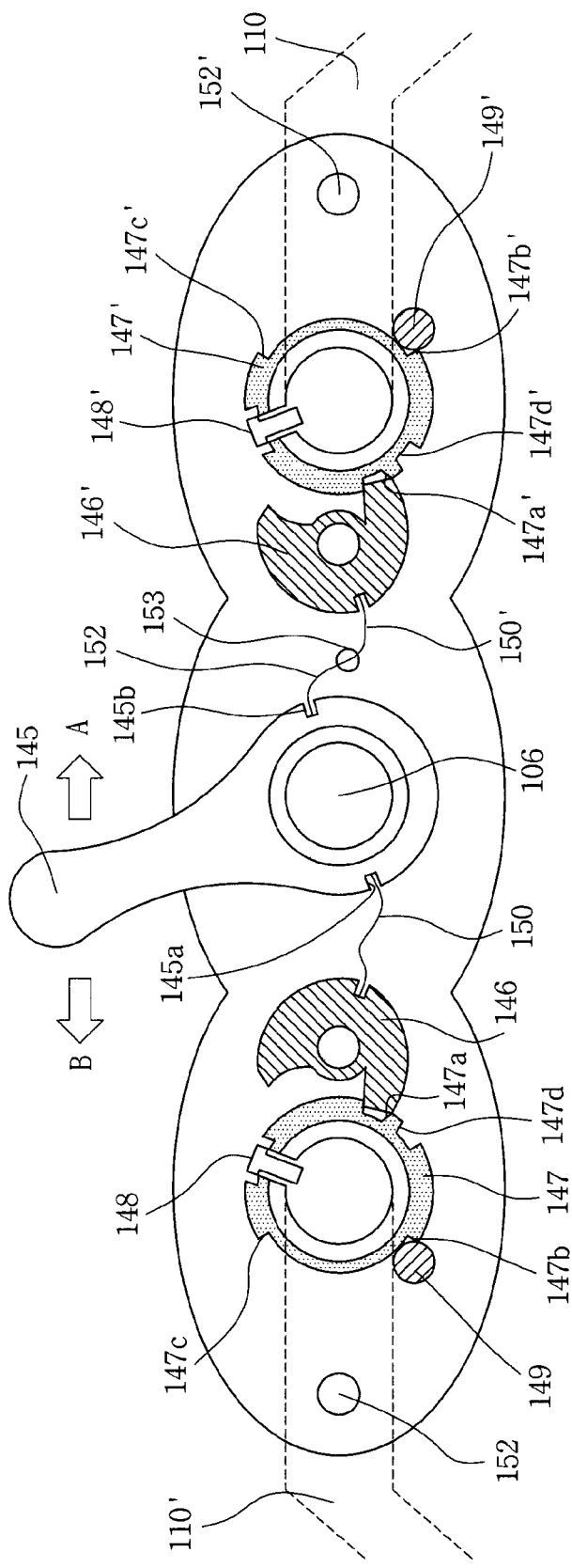
FIG. 12 is a sectional view taken along line A-A of FIG. 11.
Figure 13:
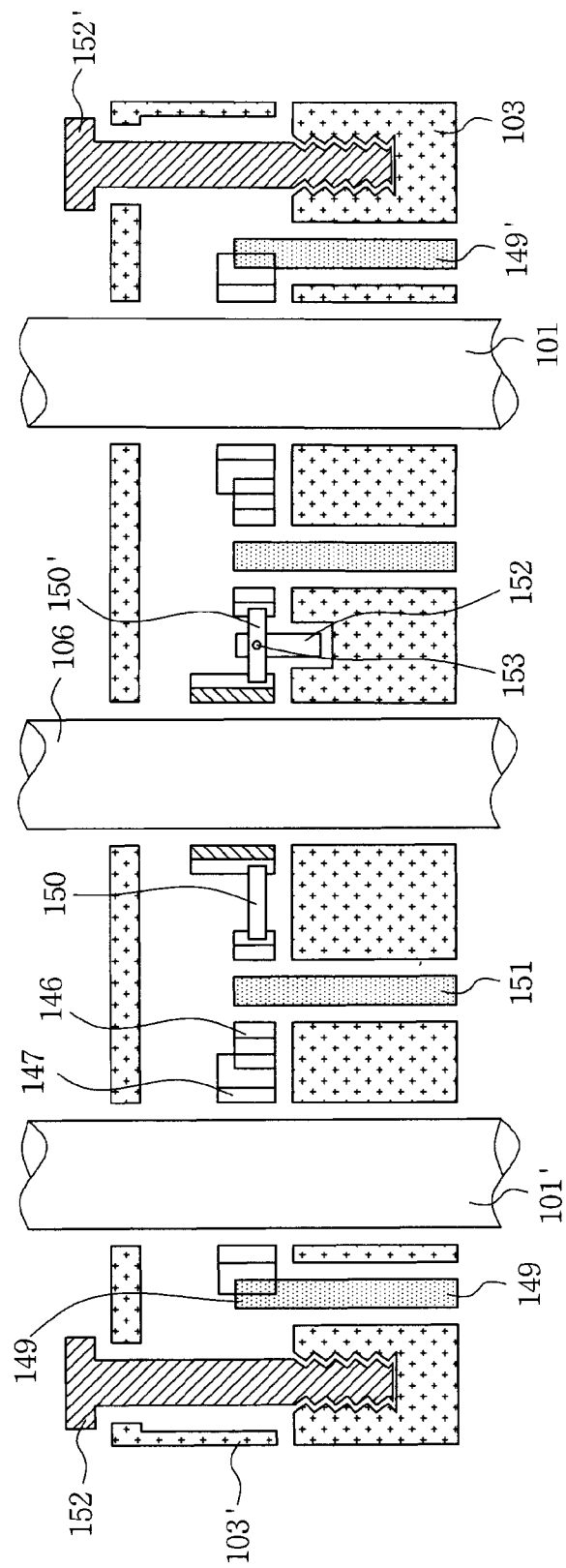
FIG. 13 is a sectional view taken along line B-B of FIG. 11.
Figure 14:
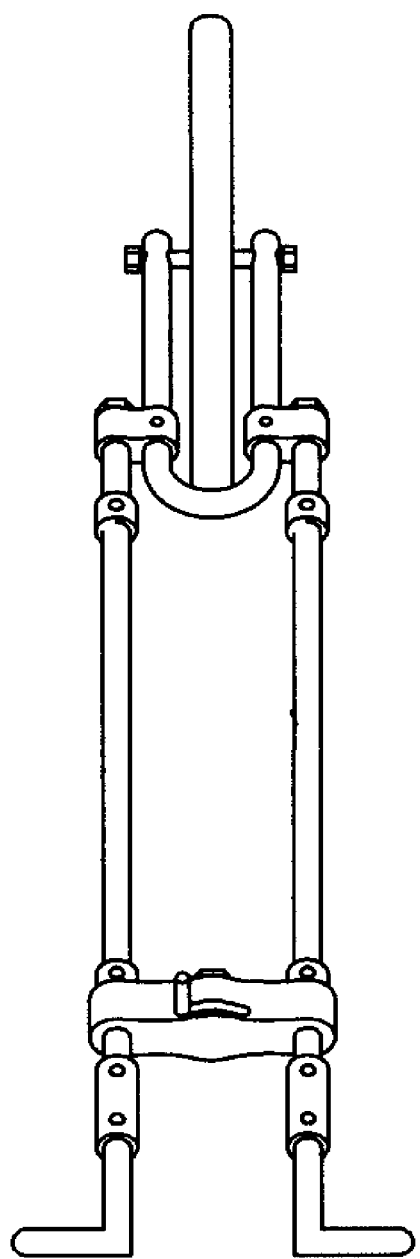
FIGS. 14 to 21 are views sequentially showing a process in which the transformable bicycle of FIG. 9 is transformed into a cart.
Figure 15:
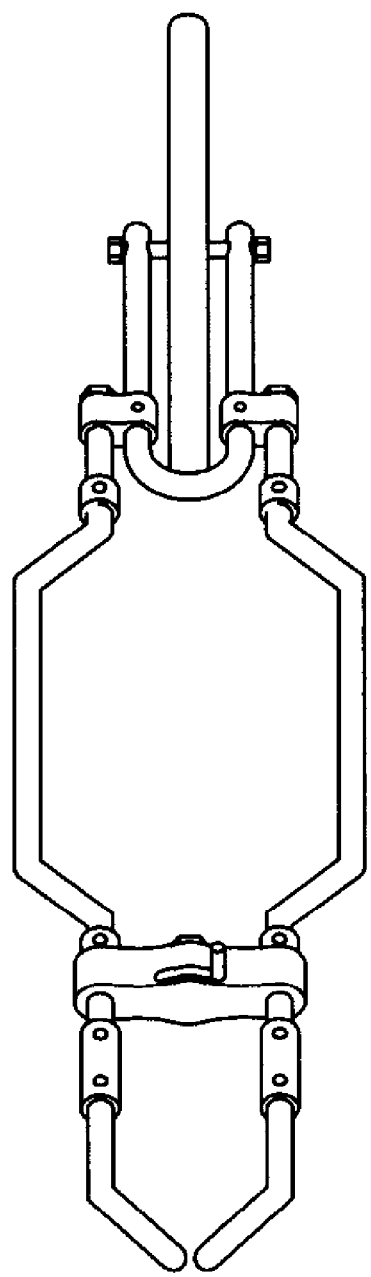
Figure 16:
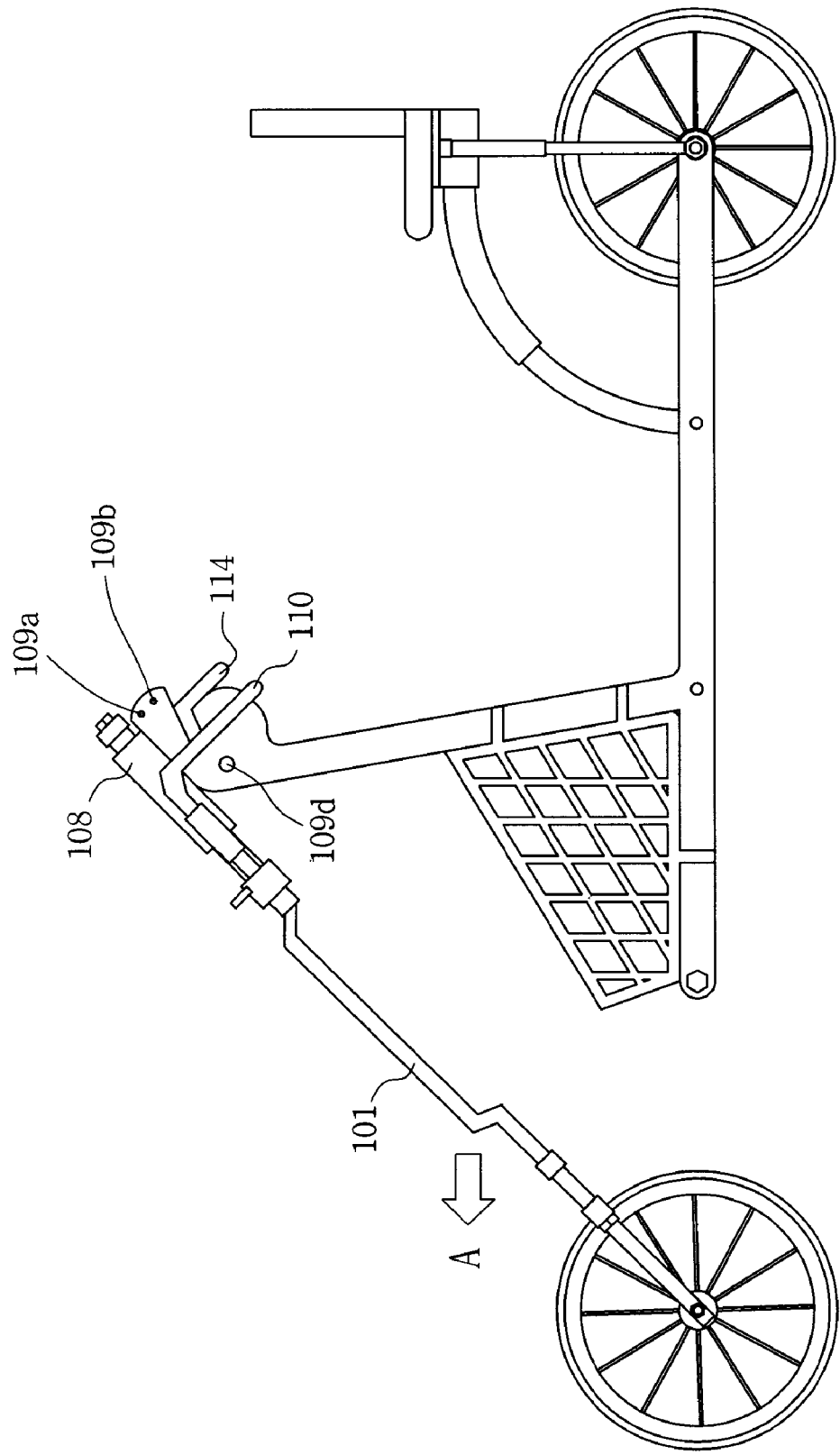
Figure 17:
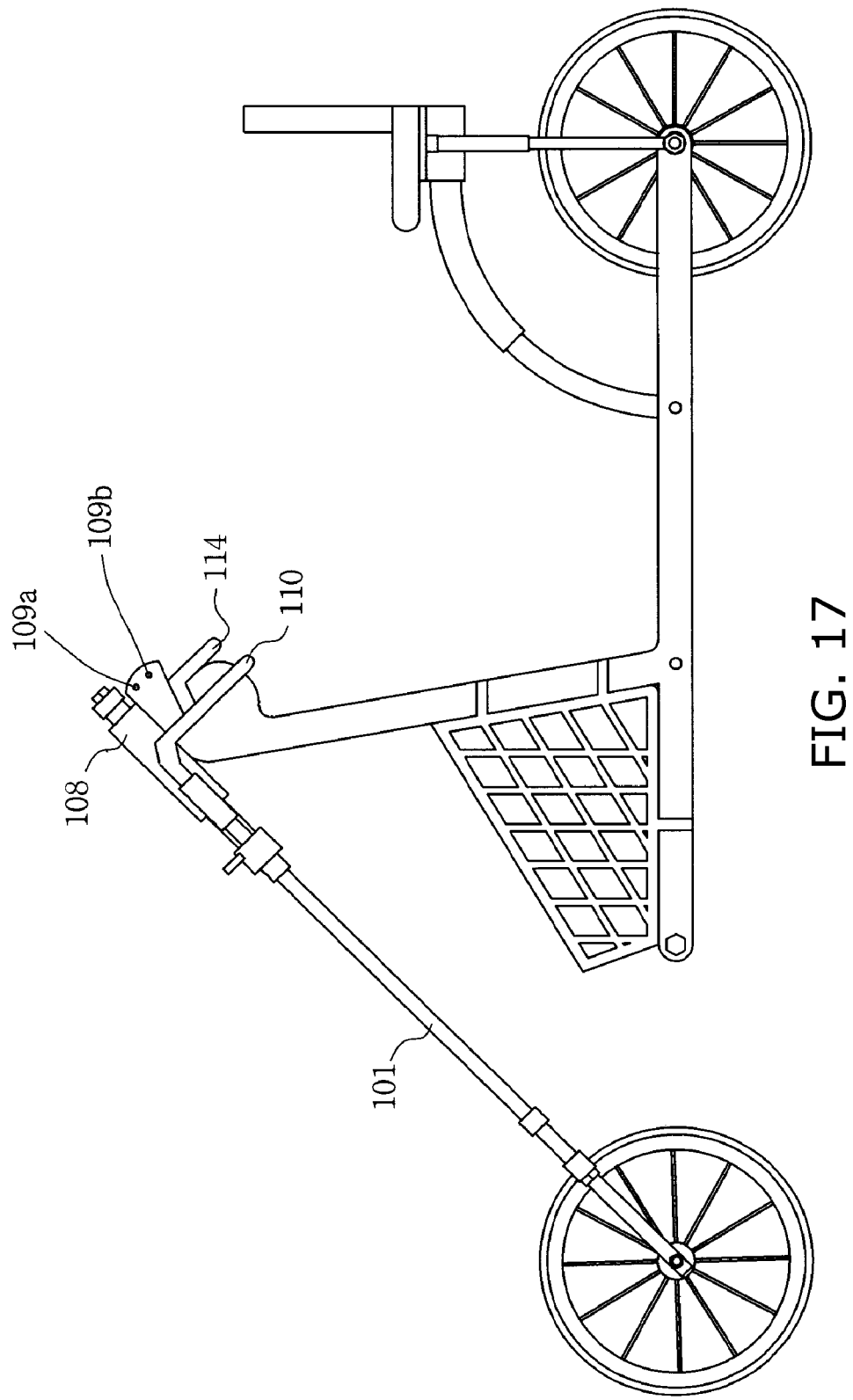

In other words, as shown in FIGS. 11 to 13, a transformable handle 145 is provided at the center of the fork support bar 103 to be rotatable in left and right directions, one side ends of the leaf springs 150 and 150' are fitted into both side slits 145a and 145b of the transformable handle 145, and the other side ends of the leaf springs 150 and 150' are fitted to ratchet stoppers 146 and 146' coupled to the fork support bar 103 through shafts 151 and 151.' The ratchet stoppers 146 and 146' are fastened in a state of being caught on the gears 147a and 147'a of fork gears 147 and 147' coupled to front fork members 101 and 101' through pins 148 and 148.'

Furthermore, the gears 147 and 147' are installed in handlebars 110 and 110,' handle fastening pins 149 and 149' are brought into close contact with the gear protrusions 147b and 147'b of the gears 147 and 147,' and thus the handlebars 110 and 110' enter a state of being fastened.

In the case where it is necessary to transform the transformable bicycle of the present invention, which is configured as described above, into a cart through folding, when the transformable handle 145 is held and moved in the direction of arrow A, as shown in FIGS. 12 and 13, the leaf springs 150 and 150' fitted into the transformable handle holes 145a and 145b are bent in a direction opposite to a current direction, and the direction of the ratchet stoppers 146 and 146' is changed into an opposite direction. Through these, the handlebars 110 and 110' are pulled and moved to the direction of arrow C. Accordingly, the gear protrusions 147b and 147'b of the gears 147 and 147' are brought into close contact with the handle fastening pins 149 and 149' and also the ratchet stoppers 146 and 146' are brought into close contact with the opposite sides of the gears 147 and 147,' so that the handlebars 110 and 110' are fastened. Through this operation, the front fork members 101 and 101' are spread outward and ensure a space for the implementation of a folding operation, as shown in FIGS. 14, 15, 16, and 17.

Figure 18:
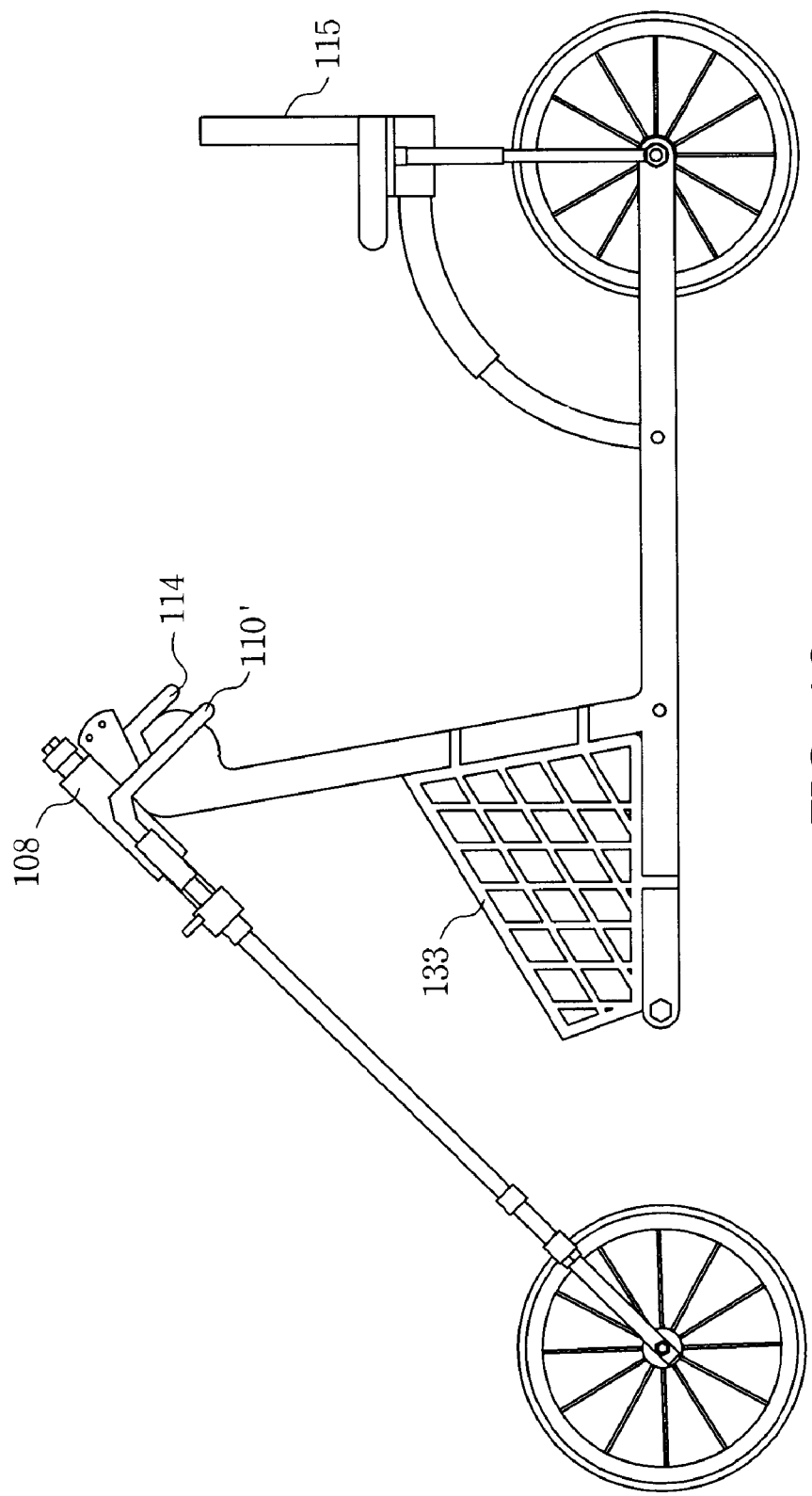
Figure 19:
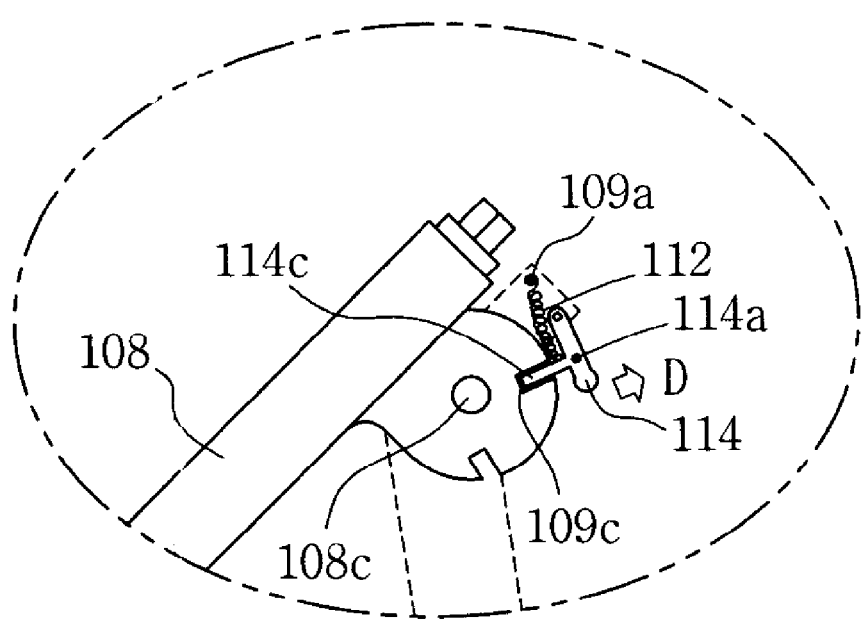

Next, as shown in FIGS. 18 and 19, one end 112a of the spring 112 is held by the frame hole 109a and the other end 112b of the spring 112 is connected to the fastening device handle hole 114a, so that tensile force is applied. Accordingly, a head tube locking slot 108b' and a frame locking slot 109c' are aligned with each other, and thus the fastening device handle 114 is inserted and fastened into the fastening device handle stopper 114c.

Figure 20:
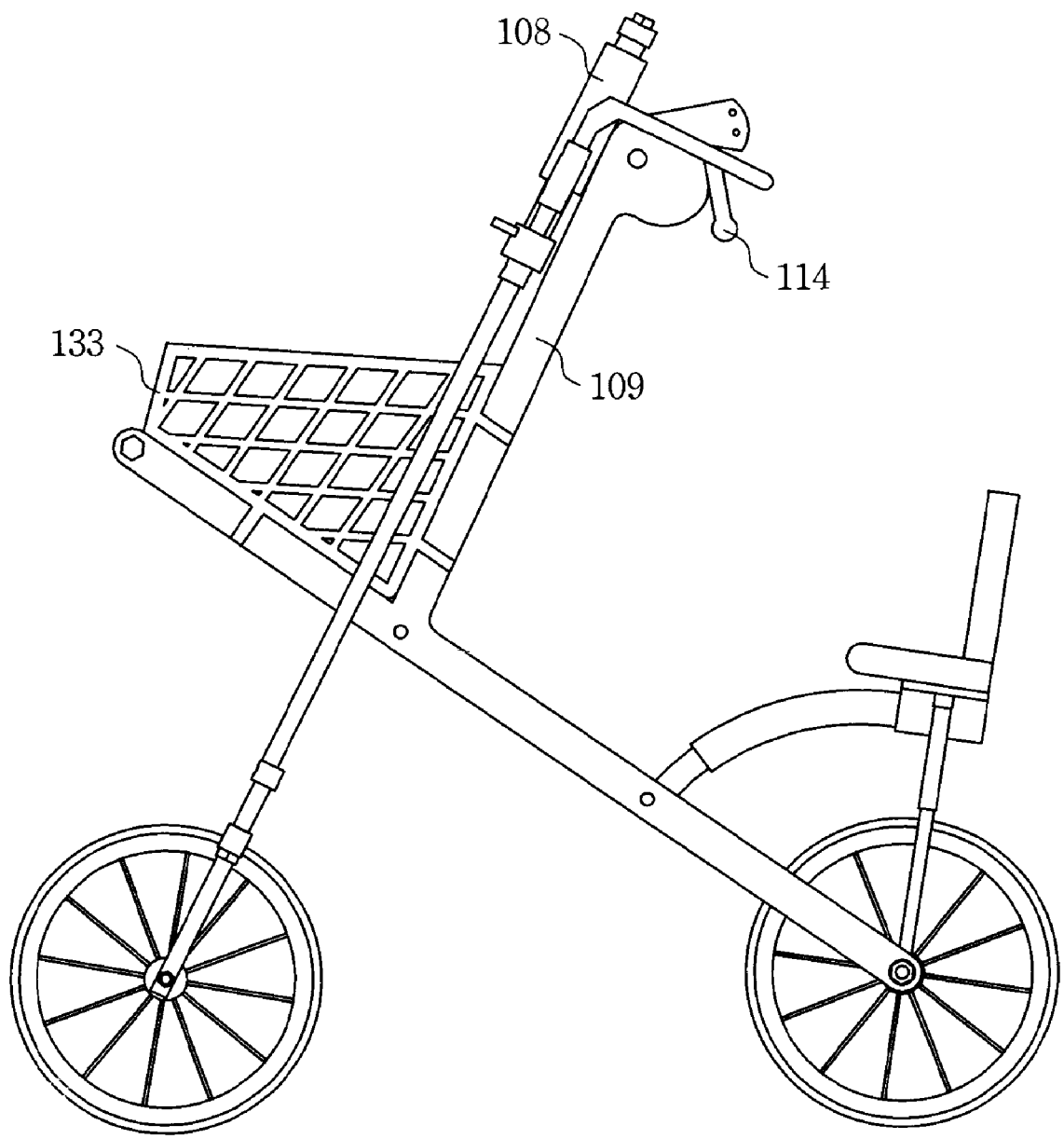
Figure 21:
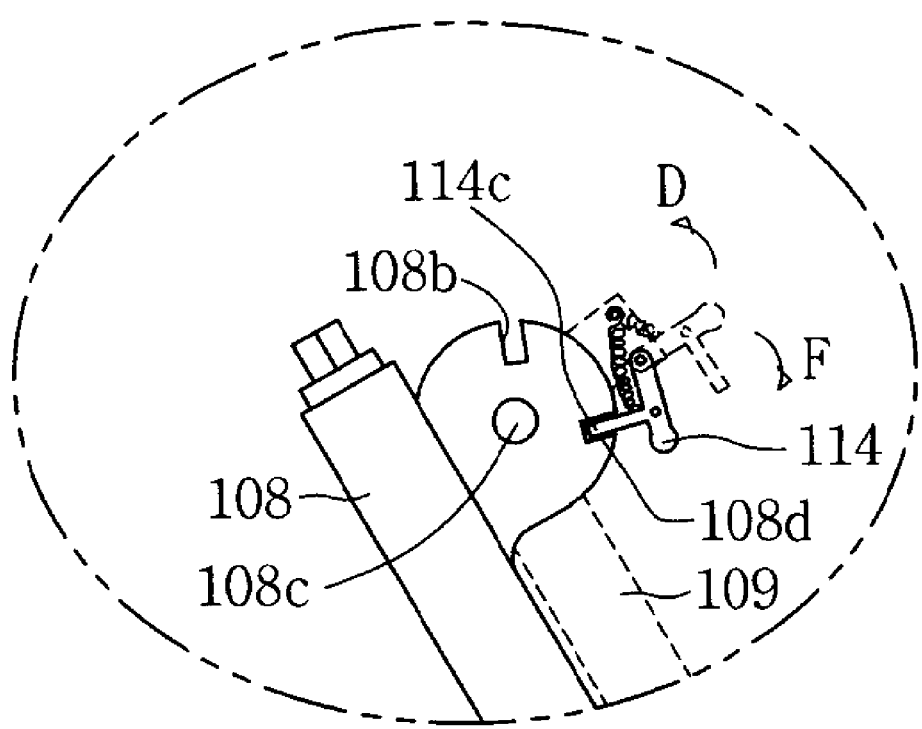

Next, as shown in FIGS. 20 and 21, when the fastening device handle 114 is held and pulled in the direction of arrow "D," the handle stopper 114c of the fastening device handle 114 is separated from the head tube locking slot 108b' of the head tube 108. Thereafter, when the front fork members 101 and 101' are folded to the frame 109 by rotating the head tube 108 toward the frame 109 and the fastening device handle 114 is released again, the fastening device handle 114 is returned by the tension force of the spring 112. In this case, the handle stopper 114c of the fastening device handle 114 is caught on another head tube locking slot 108d' of the head tube 108, and fastens the folded front fork members 101 and 101' to the frame 109.

The invention claimed is:

1. A transformable bicycle capable of being transformed into a cart through folding, the transformable bicycle comprising:
   a pair of front fork members (1 and 1') lower ends of which are connected to a front wheel (20) by fork support bars (2 and 2'), upper ends of which are connected by another fork support bar (3), and which are arranged with the front wheel (20) interposed therebetween;
   a head tube (8) which is connected the fork support bar (3) by a head tube shaft (6);
   a frame (9) which has a hole (9c') into which the head tube (8) is fitted, which is coupled to the head tube (8) by a bolt pin (29), and which is connected such that the head tube (8) is rotatable around the bolt pin (29);

a fastening device (11) which is located at an upper end of the frame (9), and which is connected to the head tube (8);

another fastening device (13) which is installed with the fastening device (11) and a spring (12) interposed therebetween;

a fastening device handle (14) which is connected to the fastening device (13) by a pin (13'), both sides of which are coupled to the frame (9) by pins (14' and 14'a), and which allows the front fork members (1 and 1') to be folded toward the frame (9) in such a manner that the fastening device handle (14) rotates the head tube (8) connected to the fastening devices (11 and 13) around the bolt pin (29) by pulling the fastening devices (11 and 13) during rotation around the pins (14' and 14'a);

a seat (15) which is supported on the frame (9) by a seat fastening device (16); and a rear wheel (21) which is connected to and installed on a back of the frame (9).

2. A transformable bicycle capable of being transformed into a cart through folding, the transformable bicycle comprising:

a pair of front fork members (101 and 101') lower ends of which are connected to a front wheel (120) by fork support bars (102), upper ends of which are connected by another fork support bar (103), and which are arranged with the front wheel (120) interposed therebetween;

handlebars (110 and 110') which are provided at upper ends of the front fork members;

a head tube (108) which is connected to the fork support bar (103) by a head tube shaft (106);

a frame (109) which has a hole (109c') into which the head tube (108) is fitted, which is coupled to the head tube (108) by a fastening bolt (17), and which is connected such that the head tube (108) is rotatable around the fastening bolt (17);

head tube locking slots (108b' and 108d') which are formed at upper and lower locations of one side surface of the head tube (108), respectively;

a frame locking slot (109b) which is formed in one side of the frame (109), and which is selectively connected to the head tube locking slots (108b' and 108d') in response to a rotation operation of the head tube (108);

a fastening device handle (114) which is coupled to the frame (109) by a pin, and which is rotated around the pin;

a handle stopper (114c) which is formed to protrude from a lower end of the fastening device handle (114), which is fitted into head tube locking slots (108b' and 108d') which are selectively connected to the frame locking slot (109b) and the frame locking slot (109b), and which fastens the head tube (108) to the frame (109);

a spring (112) which elastically connects the fastening device handle (114) and the frame (109) to each other;

a seat (115) which is supported on the frame (109) by a seat fastening device (116); and a rear wheel which is connected to and installed on a back of the frame (109).

3. The transformable bicycle of claim 2, further comprising:

a transformable handle (45) which is provided at a center of the fork support bar (3) to be rotatable in left and right directions;

leaf springs (50 and 50') one-side ends of which are fitted into both side slits (45a and 45b) of the transformable handle (450, remaining-side ends of which are fitted into ratchet stoppers (46 and 46') coupled to the fork support bar (3) through shafts (51 and 51'), and which selectively and elastically support the ratchet stoppers (46 and 46') in response to an operation of the transformable handle (45);

fork gears (47 and 47') which are coupled to the front fork members (1 and 1') through pins (48 and 48'), and which are provided with gears which engage with the ratchet stoppers (46 and 46');

gears (47 and 47') which are disposed in the handlebars (10 and 10'), respectively; and handle fastening pins (49 and 49') which come into close contact with gear protrusions (47b and 47'b) of the gears (47 and 47').

\* \* \* \* \*